United States Patent
Lennstrom (10) Patent No.: US 10,455,097 B2
(45) Date of Patent: Oct. 22, 2019

(54) SYSTEM AND METHOD FOR SENDING, DELIVERY OR RECEIVING OF FAXES, OVER A COMPUTER BASED NETWORK ACCORDING TO SECURITY OR OTHER PROTOCOLS

(71) Applicant: Open Text SA ULC, Halifax (CA)

(72) Inventor: Brian Lee Lennstrom, Anacortes, WA (US)

(73) Assignee: Open Text SA ULC, Halifax (CA)

( * ) Notice: Subject to any disclaimer, the term of this patent is extended or adjusted under 35 U.S.C. 154(b) by 134 days.

(21) Appl. No.: 15/251,942

(22) Filed: Aug. 30, 2016

(65) Prior Publication Data
US 2017/0064092 A1   Mar. 2, 2017

Related U.S. Application Data

(60) Provisional application No. 62/212,392, filed on Aug. 31, 2015.

(51) Int. Cl.
H04N 1/04 (2006.01)
H04N 1/00 (2006.01)

(52) U.S. Cl.
CPC ....... H04N 1/0022 (2013.01); H04N 1/00302 (2013.01)

(58) Field of Classification Search
CPC .......... H04N 1/0022; H04N 1/00302
USPC .................................. 358/440, 474
See application file for complete search history.

(56) References Cited

U.S. PATENT DOCUMENTS

| 6,625,642 B1 * | 9/2003 | Naylor | H04N 1/00209 |
| | | | 358/1.15 |
| 2015/0070718 A1 * | 3/2015 | Samejima | H04N 1/00973 |
| | | | 358/1.13 |

OTHER PUBLICATIONS

Section 1.0: Domain Names, Addresses, and Associated Certificates "Applicability Statement for Secure Health Transport, Version 1.1, Jul. 10, 2012" by Umesh Madan, Sean Nolan and Arien Malec: http://www.aab.org/images/aab/pdf/2014/Applicability%20Statement.pdf.*

* cited by examiner

Primary Examiner — Houshang Safaipour
(74) Attorney, Agent, or Firm — Sprinkle IP Law Group (57) ABSTRACT

Embodiments of systems and methods for the sending, delivery and receiving of faxes according to particular protocols are disclosed. Certain embodiments may receive a fax from a sender and determine if the ability exists to send the fax over a computer based network according to a particular protocol. If there is no destination associated with the fax number for the protocol the fax may be sent according to the fax number. If, however, there is a destination for the protocol associated with the fax number an attempt is made to send the fax to the destination according to the protocol.

15 Claims, 4 Drawing Sheets

SYSTEM AND METHOD FOR SENDING, DELIVERY OR RECEIVING OF FAXES, OVER A COMPUTER BASED NETWORK ACCORDING TO SECURITY OR OTHER PROTOCOLS

RELATED APPLICATION(S)

This application claims the benefit of priority to U.S. Provisional Patent Application No. 62/212,392 filed Aug. 31, 2015, entitled "SYSTEM AND METHOD FOR SENDING, DELIVERY AND RECEIVING OF FAXES, INCLUDING DELIVERY OF FAXES OVER A COMPUTER BASED NETWORK ACCORDING TO SECURITY OR OTHER PROTOCOLS"" by Brian Lennstrom, which is hereby fully incorporated by reference herein for all purposes.

TECHNICAL FIELD

This disclosure relates generally to data delivery in a network environment. More particularly, this disclosure relates to the transmission, delivery or reception of data through computer based networks or telephone networks. Even more specifically, this disclosure relates to the transmission, delivery or reception of faxes through computer based networks or telephone networks, including ensuring adherence to a security or other type of protocol during delivery of a fax at least partially over a computer based network.

BACKGROUND

Entities such as consumers, organizations, enterprises, governments, health care entities, etc. need to exchange data for a variety of reasons, as may be easily imagined. In the modern world, this data exchange is often times accomplished electronically using a variety of methodologies. These methodologies include, for example, local storage (e.g., a thumb driver holding the data which can be physically delivered to a recipient), file transfer using particular protocols (e.g., file transfer protocol (FTP)), sending an email with an attachment, fax, etc.

While all these methods serve the same end, each of these methodologies has differing capabilities with respect to various characteristics such as ease of use, speed, security (e.g., the ability to resist interception or tampering), traceability, cost, etc. For example, using local storage may not feasible if two entities are widely dispersed geographically, while email attachments may not be secure enough to address some entities' concerns.

Faxing has proven useful in addressing many concerns of various entities while still meeting their data distribution needs. Faxing is thus still heavily utilized by individuals and the workflows of various entities. A facsimile (fax) comprises a document in a digital image format. The document is associated with a destination specified with respect to a publicly switched telephone network (PSTN). Thus, typically for at least a portion of the transmission, the document is transmitted over the PSTN. Faxing provides a secure, traceable and non-repudiable mechanism for content delivery and can be particularly useful in particular environments.

This is certainly the case in the health care field. A wide variety of concerns, in large part having to do with the desire to secure protected health information and maintain patient confidentiality, have led health care providers and other entities in the health care field to maintain faxing as a preferred method of transmitting health care related documents (and in particular patient related documents) between these entities.

Faxing, however, has limitations. For example, conventional fax machines can only transmit black and white files with limited resolution in a specific format such as the Tagged Image File Format (TIFF). Further, the transmission speed over the PSTN can be very slow compared to today's computer based networks. Additionally, as faxing may use the PSTN, faxing between two entities that are in different geographic area may require an expensive phone call. Accordingly, traditional faxing may be expensive as well as slow.

To address at least some of these concerns, certain methods and systems for exchanging data in a manner that is easy to use, relatively fast, secure and cost effective while still remaining compatible with previous methods for data exchange (especially those that that may have been utilized in various workflows, such as faxing, etc.) have been implemented. However, in certain areas, such as the health care field, these methods and systems cannot be effectively utilized because of concerns related to the security and confidentiality of data.

While there may be certain protocols in place to address the security or other concerns or issues with the use of faxing of data, implementing such protocols within the context of faxing or enforcing adherence to such protocols may be difficult for a number of reasons. It would thus be desirable to be able to implement or improve the use of such protocols, including security protocols or the like, in conjunction with transmission of data, including faxes.

SUMMARY

Embodiments of the systems and methods disclosed herein may address the above concerns, among other advantages. Specifically, embodiments as disclosed herein may integrate systems that transmit documents with sensitive information with information exchange systems that are capable of sending faxes either over the PSTN or a computer based network. In particular, embodiments may provide an integration component that sits between fax senders and information exchange systems. When a fax is received from a document sender at the integration component, it can be determined if the ability exists to send the document of the fax over a computer based network according to a particular secured protocol.

Specifically, in certain embodiments it can be determined if there is a destination address for that secured protocol associated with the destination telephone number for that fax (referred to as the fax number). If there is no destination address associated with the fax number the fax may be passed to the information exchange system which may send the fax to the fax number over the PSTN. Conversely, in certain embodiments if there is a destination address for the secure protocol associated with the fax number an attempt is made to send the document of the fax to the destination address using the secure protocol.

In particular, in the context of the health care industry for example, a secure protocol known as Direct messaging may be utilized. Accordingly, embodiments as disclosed herein may provide systems and methods for converting a fax to a Direct message. Certain embodiments may include a faxing system configured to send the fax and an integration component known as a traffic manager. The traffic manager may receive a fax including a document and a destination telephone number from a sender and determine if there is a Direct address associated with the destination telephone number. If there is a Direct address associated with the destination telephone number the traffic manager may initiate the sending of a Direct message with the document or payload of the fax to the Direct address, while if there is not a Direct address associated with the destination telephone number the fax may be sent through the fax system based on the destination telephone number.

Various embodiments may include sending the fax to the destination telephone number over a publicly switched telephone network (PSTN) in addition to sending the same document over the computer based network.

Additionally, in certain embodiments, the document is received by the traffic manager over a computer based network in an unstructured print stream format. The traffic manager can convert the document to a searchable format before initiating the sending of the Direct message. The conversion to the searchable format may aid in the extraction of patient identification metadata from the document to, for example, create a Direct message including this metadata.

In one embodiment, if there is not a Direct address associated with the destination telephone number the traffic manager may send an invitation fax to the destination telephone number. This invitation fax may include a location to access an interface through a computer based network to provide or obtain a Direct address to associate with the telephone number of the fax. Accordingly, in the future, faxes sent to the destination telephone number may be sent to the obtained Direct address.

As can be seen then, embodiments as disclosed may provide a number of advantages. Importantly, embodiments as disclosed may provide the advantages of sending messages according to a secured protocol (e.g., the Direct protocol) where messages can be sent according to this protocol while still retaining the secure, traceable and non-repudiable mechanism of faxing in cases where sending the message according to the secured protocol is not possible. Part and parcel with this advantage then, is the ability to easily and seamlessly integrate embodiments as disclosed with existing applications, systems and workflows that are designed to work with fax.

As a consequence, the advantages of the secured protocol are achieved in instances where it is possible to send according to the secured protocol while the advantages of faxing are retained in cases where it is not possible. Moreover, no additional burden (either from a personnel or management standpoint) is required from senders to achieve these advantages.

Additionally, embodiments may allow a recipient of faxes to easily obtain a Direct address and integrate the Direct address with their existing fax infrastructure through the use of invitation faxes sent to a recipient's fax number. The invitation may include locations on a computer based network that a recipient may access to provide or obtain a Direct address, where that Direct address may subsequently be associated with the recipient's fax number. Thus, a Direct address can be relatively easily associated with the recipient's fax number for future use.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, it will be helpful to remember the context described above. Various entities need to exchange data for a variety of reasons, as may be easily imagined. In the modern world, this data exchange is often times accomplished electronically using a variety of methodologies. One of these methodologies is the faxing of such data. A facsimile (fax) comprises a document in a digital image format. The document is associated with a destination specified with respect to a publicly switched telephone network (PSTN). Faxing provides a secure, traceable and non-repudiable mechanism for content delivery and can be particularly useful in particular environments.

One of those environments is the health care field. Faxing is still heavily utilized in the health care field at least because of the desire to secure medical data and maintain patient confidentiality. Moreover, the inertia caused by implemented and familiar systems have led health care providers and other entities in the health care field to maintain faxing as a preferred method of transmitting health care related documents (and in particular patient related documents) between entities.

Faxing, however, has limitations. Accordingly, certain methods and system for exchanging data in manner that is easy to use, relatively fast, secure and cost effective and yet still may be compatible with previous methods for data exchange have been implemented. However, in certain areas, such as the health care field, these methods and systems cannot be effectively utilized because of concerns related to the security and anonymity of data.

To attempt to address these concerns, certain protocols for the exchange of such sensitive data have been developed. For example, in the health care field, the Direct Project and the Applicability Statement for Secure Health Transport (all versions of which are hereby incorporated herein by reference in their entirety) define how to securely transport health information over the Internet using email and security protocols. Participants in an exchange of information are identified using standard (e.g., SMTP) email addresses associated with security certificates (e.g., X.509 certificates). Thus, a Direct address is an email address linked to an associated certificate that confirms the identity of the domain name or address.

These types of protocols present certain problems of their own, however. For example, participants in the Direct project may be required to maintain or otherwise manage certificates and associated Direct addresses. This management may become cumbersome and is unrelated to the provisioning of health care itself. Thus, the use of the Direct protocol has itself served as an impediment to the widespread adoption and integration of certain methods and system for exchanging data use with health care related information.

Accordingly, certain entities have emerged that manage these addresses and certificates, and the transport of Direct messages, for the health care entities. These management entities are referred to as Health Information Service Providers (HISPs). A HISP manages Direct addresses and the associated certificates, allowing Direct messages to be sent by a sender through the HISP without the sender being concerned for the recipient's certificate. The verification of the recipient and the sending of the message to the recipient (e.g., through the recipient's HISP) can be handled by the sender's HISP, alleviating the sender of the burden of using the Direct protocol to send a Direct message.

Direct messaging using these HISPs is not without its own issues, however. One of the larger issues pertains to the delivery of these Direct messages. Specifically, if such Direct messages cannot be delivered, a message delivery failure notification (e.g., a type of message disposition notification (MDN) or delivery status notification (DSN)) may be returned to the sender, but no further action may be taken by the HISP.

Thus, Direct messaging, even using HISPs, while useful, cannot currently emulate the non-repudiable nature of faxing. Accordingly, while these HISPs have been somewhat effective in reducing the effort and time it takes to send Direct messages, there has heretofore still not been any way to integrate Direct messaging into existing workflows, including existing workflows that utilize faxing.

Embodiments of the systems and methods disclosed herein may accomplish just that, among other advantages. Specifically, embodiments as disclosed herein may integrate systems that transmit documents with sensitive information with information exchange systems that are capable of sending faxes either over the PSTN or a computer based network. In particular, embodiments may provide an integration component that sits between fax senders and an information exchange systems. When a fax is received from a document sender at the integration component, it can be determined if the ability exists to send the document of the fax over a computer based network according to a particular secured protocol.

More precisely, in certain embodiments it can be determined if there is a destination address for that secured protocol associated with the destination telephone number for that fax (referred to as the fax number). If there is no destination address associated with the fax number the fax may be passed to the information exchange system which may send the fax to the fax number over the PSTN or may send the document to an email address associated with the fax number, depending for example on a configuration of the information exchange system associated with that fax number. Conversely, if there is a destination address for the secure protocol associated with the fax number an attempt is made to send the document of the fax to the destination address using the secure protocol.

In the context of health care field using the Direct protocol, a document sender may include an electronic medical record system (EMR), an electronic health record system (EHR) or the like. According to embodiments then, when a fax including document is received from such a sender (or when a document is designated as containing protected health information) at the integration component, the destination telephone number (the fax number) associated with the fax can be determined from the fax. Using that fax number it can be determined if there is a Direct address associated with that fax number by accessing an address book that maps fax numbers to Direct addresses. If there is no Direct address associated with fax number the fax may be passed to the information exchange system which may send the fax to the fax number over the PSTN or may send the document to an email address associated with the fax number, depending for example on a configuration of the information exchange system associated with that fax number.

If there is a Direct address associated with the fax number, an attempt is made to send the document of the fax to the Direct address using the Direct protocol. Specifically, in one embodiment an interface may be provided by a Direct messaging component whereby the document and the determined Direct address can be sent to the Direct messaging component using the interface. The Direct messaging component attempts to determine appropriate patient metadata for the Direct protocol (e.g., name, date of birth, gender, etc.). Once the metadata is determined, a Direct message to the determined Direct address is formed where the Direct message includes the document or the content of the document and the determined metadata. The Direct message is then encrypted and sent (e.g., via simple mail transfer protocol (SMTP)) to the recipient (e.g., through the HISP associated with the Direct address).

If there is a failure during the attempt to create or send the Direct message, for example, because adequate patient data in accordance with the Direct protocol could not be extracted from the document or sending the message to the recipient failed (e.g., a message delivery failure notification (e.g., a negative or failure MDN was received from the recipient's HISP), a message delivery failure may be returned to the integration components. The integration component may then pass the fax (e.g., document and associated fax number) to the information exchange system which may send the fax to the fax number over the PSTN or may send the document to an email address associated with the fax number, depending for example on a configuration of the information exchange system associated with that fax number.

As can be seen then, embodiments as disclosed may provide a number of advantages. Importantly, embodiments as disclosed may provide the advantages of sending messages according to a secured protocol (e.g., the Direct protocol) when messages can be sent according to this protocol while still retaining the secure, traceable and non-repudiable mechanism of faxing in cases where sending the message according to the secured protocol is not possible. Part and parcel with this advantage then, is the ability to easily and seamlessly integrate embodiments as disclosed with existing applications, systems and workflows that are designed to work with fax. As a consequence, the advantages of the secured protocol are achieved in instances where it is possible to transmit according to the secured protocol while the advantages of faxing are retained in cases where it is not possible. Moreover, no additional burden (either from a personnel or management standpoint) is required from senders to achieve these advantages.

It will now be helpful to discuss embodiments in more detail. It should be noted, however, that while these embodiments are described with respect to the health care field, and the use of the Direct protocol to send such health care information, other embodiments may be equally well applied to the sending of documents in conjunction with other protocols (security or other protocols that are generally applicable or specific to other fields) that exist currently or may be developed in the future.

Figure 1:
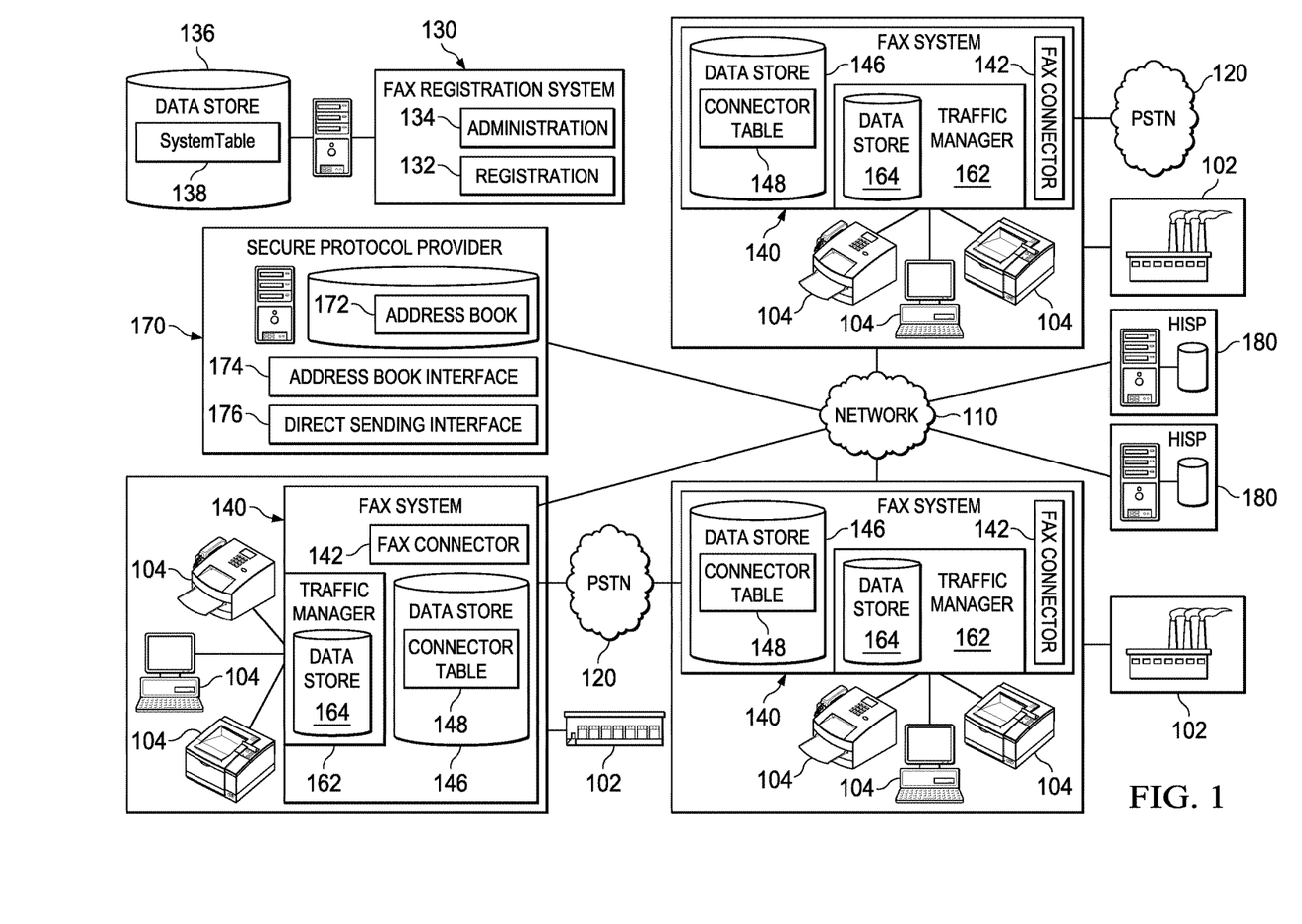
FIG. 1 is a block diagram depicting one embodiment of an architecture for a faxing system including a traffic manager.

With that in mind, turning now to FIG. 1, one embodiment of an architecture for implementing secure messaging protocols in association with faxing is depicted. Here, the architecture includes a fax system 140 with an integration component 162 (referred to also as the traffic manager). Fax systems 140 and fax registration system 130 communicate over a computer based network ("network") 110 which may be, for example, the Internet, an internet, an intranet, a Local Area Network (LAN), a Wide Area Network (WAN), an Internet Protocol (IP) based network, a wireless network, a wireline network, some combination of networks, etc.

Fax system 140 is installed at a site where users wish to send or receive faxes. Users in such an architecture may be companies, individual users, or any other entity wishing to send or receive faxes. Accordingly, fax system 140 may be one or more computing devices or one or more computer processes executing on one or more computer devices utilized by such users to send or receive faxes. Fax system 140 may include a fax server such as the RightFax Enterprise Edition fax server or the like. Fax system 140 therefore provides an interface such as an Application Programming Interface (API), web service interface (e.g., a RESTful interface), hardware interface, or another type of interface through which a fax to send may be received from a client 104 of the fax system 140. These clients 104 may include a fax machine, a printer, a software application (e.g., an EHR or EMR system), etc.

Fax system 140 may also include an interface to PSTN 120 and be configured to send or receive faxes over the PSTN 120. Additionally, fax system 140 includes fax connector 142 for transmitting faxes received from clients 104 over network 110 and receiving faxes transmitted over network 110. Fax system 140 may communicate with fax registration system 130 over network 110 to facilitate transmission of these faxes.

Fax registration system 130 includes a registration module 132 and an administration module 134. Administration module 134 is configured to provide an interface by which users who wish to receive faxes at their site may provide destination data. Such destination data may include, for example, a destination on the PSTN (e.g., a telephone number) associated with their fax system 140 or a location on network 110 associated with their fax system 140 (for example, a universal resource locator (URL), a universal resource indicator, an IP address, etc.). This destination data may be stored in registration system table 138 in data store 136. Thus the registration system table 138 may comprise a set of registered destinations and associated destination data. Administration module 134 may also present an interface by which users of registration system 130 may obtain or view statistics on faxes sent or received at an associated fax system such as data usage, status on delivery, etc.

Registration module 132 may provide an interface such as a web service interface by which such destination data may be obtained. More specifically, this interface may be configured such that a synchronization request may be received. In response to such a synchronization request, registration module 132 may return a list of the destinations on the PSTN 120 associated with fax systems 140 that are stored in registration system table 138.

The interface of registration module 132 may also be configured to receive a request for destination data associated with a particular destination on the PSTN 120. In response to such a request for destination data, the registration module 132 may return a location on the network 110 associated with the destination on the PSTN 120 if the destination on the PSTN 120 is in registration system table 138.

Accordingly, at various intervals (e.g., hourly, daily weekly, etc.) fax connector 142 may send a synchronization request to registration module 132 of the fax registration system 130 and receive a list of registered destinations on the PSTN 120 in response to the request. Fax connector 142 may store the received registered destinations on the PSTN 120 in connector table 148 in data store 146. In some embodiments, destination data associated with the registered destinations may also be received and stored in the connector table 148.

When a user wishes to send a fax he may utilize a client 104 at the user's site to send the fax. Client 104 provides the fax to the fax system 140. Fax system 140 may therefore receive a fax intended for a destination on the PSTN 120 (e.g., associated with a telephone number for the fax). The fax system 140 may check the connector table 148 (or send a request to fax registration system 130) to determine if the destination on the PSTN 120 associated with the received fax is a registered destination in the connector table 148. If it is not, the fax may be transmitted to the destination over the PSTN 120.

If, however, the destination on the PSTN 120 is a registered destination in the connector table 148 (or at fax registration system 130), fax connector 142 may access destination data associated with the destination on the PSTN in connector table 148 or may request destination data associated with the destination on the PSTN from registration module 132 of the fax registration system 130. In response, fax connector 142 may receive destination data associated with the destination on the PSTN 120, including a location on network 110 associated with the destination on the PSTN 120.

Fax connector 142 may then transmit the fax over the network 110 to that location on the network 110. If there is an error in the transmission or the transmission is otherwise unsuccessful the fax may be sent over the PSTN 120 to the original destination on the PSTN 120 provided by the user. If the transmission is successful the fax connector 142 associated with the location on the network 110 may receive the fax and deliver or otherwise present the fax to a user at an entity 102.

As discussed above, however, such fax systems 140 are installed at a wide variety of sites. Thus, in certain cases, fax system 140 may be installed at hospitals, insurance companies, physician's offices, lawyers' offices, etc. where it is desired to send sensitive health care information. In such cases, clients 104 may be, for example, electronic medical records systems or the like such as, for example, Epic Systems Corporation's EHR software.

In these embodiments, then, fax system 140 interfaces with a traffic manager 162 and an associated data store 164. Traffic manager 162 provides an interface (e.g., API, web service, etc.) that allows client 104 to send a fax. In some embodiments, this interface may allow a user to designate whether such a fax should be sent via a secure protocol or a particular secure protocol such as the Direct protocol. Alternatively, in some embodiments, traffic manager will treat all incoming faxes received from a particular client 104 (which may be configured) or all clients 104 as containing protected health care data. The documents received for a fax may be received in a traditional fax format such as a TIFF or other unstructured print stream type of document or may be in a native format such a produced by a particular application (e.g., a Word document, a Power Point, etc.). Traffic manager 162 may have an associated data store 164 for storing received faxes (e.g., fax number and associated document). In some embodiments, as the document is treated as having protected health care data it may be encrypted before it is stored in the associated data store 164.

Traffic manager 162 may utilize a secure protocol provider 170 to attempt to send the document via the Direct protocol. Secure protocol provider 170 may include an address book 172 that includes a mapping between fax numbers and associated Direct addresses. The secure protocol provider 170 may provide an address book interface 174 that allows a user to assign a Direct address to a particular fax. The secure protocol provider 170 may also provide an interface to obtain a Direct address. Such Direct addresses may be provided or otherwise obtained from HISPs 180 (such as Surescripts, athenahealth, Data Motion, etc.).

Secure protocol provider 170 may also include a Direct sending interface 176 which can be accessed to send a document according to the Direct protocol. For example, the Direct sending interface 176 can be an API or web service which can be called with the document and the Direct address to send the document to the Direct address according to the Direct protocol as will be discussed in detail at a later point herein. Embodiments of such a secure protocol provider 170 include, for example, Kno2 from the vendor with the same name.

According to embodiments then, when a fax including a document is received at the traffic manager 162 from a particular client 104 (e.g., an EMR or EHR) (or when a document is designated as containing protected health information), the fax number associated with the fax can be determined. Traffic manager 162 sends a request to the address book interface 174 with the fax number of the fax to determine if there is a Direct address associated with that fax number. Address book interface 174 accesses address book 172 that maps fax numbers to Direct addresses. Based on the access, the address book interface 174 either returns the Direct address associated with the fax number or an indication that no Direct address associated with the fax number could be found.

Traffic manager 162 receives the response from the address book interface 174 and if there is an indication that no Direct address exists for the fax number the traffic manager 162 may pass the fax to the fax system 140, for example, using the interface provided by the fax system 140 for the general sending of faxes as detailed above. The fax system 140 may then send the fax to the fax number over the PSTN 120 or may send the document to an email address associated with the fax number over network 110, depending for example on a configuration of the information exchange system associated with that fax number as detailed above.

Additionally, traffic manager 162 may send a fax to the fax number associated with the fax through the fax system 140 (e.g., over the PSTN 120 or to an email address associated with the fax number over network 110) where the fax invites the recipient to join the Direct access faxing network. In one embodiment, this invitation fax may include two universal resource locators (URLs). A first URL may be indicated for use by the recipient if the recipient already has a Direct address and a second URL to utilize if the recipient does not have a Direct address. The URLs may be associated with address book interface 174 at secure protocol provider 170.

By accessing the first URL (e.g., by typing it into a browser or clicking on it in the case where the fax is delivered as an email, etc.) the address book interface 174 may provide an interface for the recipient where the recipient can provide their Direct address in association with the fax number (e.g., the fax number originally associated with the fax) after undergoing an identity verification process. The mapping between the fax number and Direct address is then stored in the address book 172 for future use.

If the recipient access the second URL the address book interface 174 may provide an interface for the recipient where the recipient can, after undergoing an identity verification process, register for a Direct address and a corresponding digital certificate from HISP 180. HISP 180 can then issue a Direct address and digital certificate and the mapping between the fax number and Direct address is then stored in the address book 172. Alternatively, the second URL may take the recipient to register directly with HISP 180 to obtain a Direct address and the digital certificate, after which it can be provided through address book interface 174 to be stored in the address book 172. In this manner, new participants may easily and efficiently be added to the fax network environment.

If, instead of receiving a response from address book interface 174 that indicates no Direct address exists for the fax number, the traffic manager 162 receives a response from the address book interface 174 including a Direct address associated with the fax number, an attempt is made to send the document of the fax to the Direct address using the Direct protocol. Here, the traffic manager 162 may utilize Direct sending interface 176 of secure protocol provider 170 to send the document. To allow the secure protocol provider 170 to better accomplish this sending, in cases where the document of the fax is received in other than a native format (e.g., if it is received as a print stream or TIFF) Optical Character Recognition (OCR) may be performed on the document by traffic manager 162 to generate a searchable document such as a Portable Document Format (PDF) file.

Accordingly, traffic manager 162 utilizes Direct sending interface 176 to request the document be sent according to the Direct protocol and provides the document (e.g., the original native document or the searchable document in the case of an original non-native document) and the Direct address through the Direct sending interface 176.

Direct sending interface 176 attempts to determine appropriate patient metadata for the Direct protocol (e.g., name, date of birth, gender, etc.) by, for example, searching through the received document for certain keywords (or set of keywords), or a particular data format. The metadata needed may be specified, for example, by the specification for the Direct protocol. If the specified metadata cannot be found in the received document a message delivery failure notification (e.g., negative or failure MDN) may be returned from the Direct sending interface 176 to the requesting traffic manager 162.

If such a notification is received by the traffic manager 162, the traffic manager 162 may pass the fax to the fax system 140, for example, using the interface provided by the fax system 140 for the general sending of faxes as detailed above. In one embodiment, the fax may be retrieved from the data store 164 associated with the traffic manager 162 and decrypted before it is passed to the fax system 140. The fax system 140 may then send the fax to the fax number over the PSTN 120 or may send the document to an email address associated with the fax number, depending for example on a configuration of the information exchange system associated with that fax number as detailed above.

If, however, the Direct sending interface 176 can determine the desired metadata from the received document, a Direct message to the determined Direct address is formed (e.g., an email to the Direct address), where the Direct message includes the received document or the content of the document and the determined metadata. The Direct message is then encrypted and sent (e.g., via SMTP) to the recipient (e.g., through the HISP 180 associated with the Direct address).

If there is a failure during the attempt to send the Direct message by the Direct sending interface 176 through HISP 180 a delivery failure notification (e.g., a negative or failure MDN) may be received by the Direct sending interface 176 from the HISP 180. In this case, a delivery failure notification may be, in turn, returned from the Direct sending interface 176 to the requesting traffic manager 162. If such a notification is received by the traffic manager 162, the traffic manager 162 may pass the fax to the fax system 140, for example, using the interface provided by the fax system 140 for the general sending of faxes as detailed above.

In one embodiment, the fax may be retrieved from the data store 164 associated with the traffic manager 162 and decrypted before it is passed to the fax system 140. The fax system 140 may then send the fax to the fax number over the PSTN or may send the document to an email address associated with the fax number, depending for example on a configuration of the information exchange system associated with that fax number as detailed above.

It will be noted with respect to embodiments of the above architecture that the embodiments may include a fax system operating in conjunction with each entity. Thus, each entity may require access to the PSTN in conjunction with such a fax system. It may be desired by certain entities therefore to alleviate the need to maintain access to the PSTN by a faxing system or to otherwise offload the faxing functionality to a greater degree. Accordingly, a remote faxing system may be utilized by such entities, whereby a fax may be sent over a computer network to the remote faxing system and the remote faxing system is responsible for delivering the fax. It is still desirable, however, to integrate the use of Direct messaging protocol with such remote faxing systems and architectures.

Figure 2:
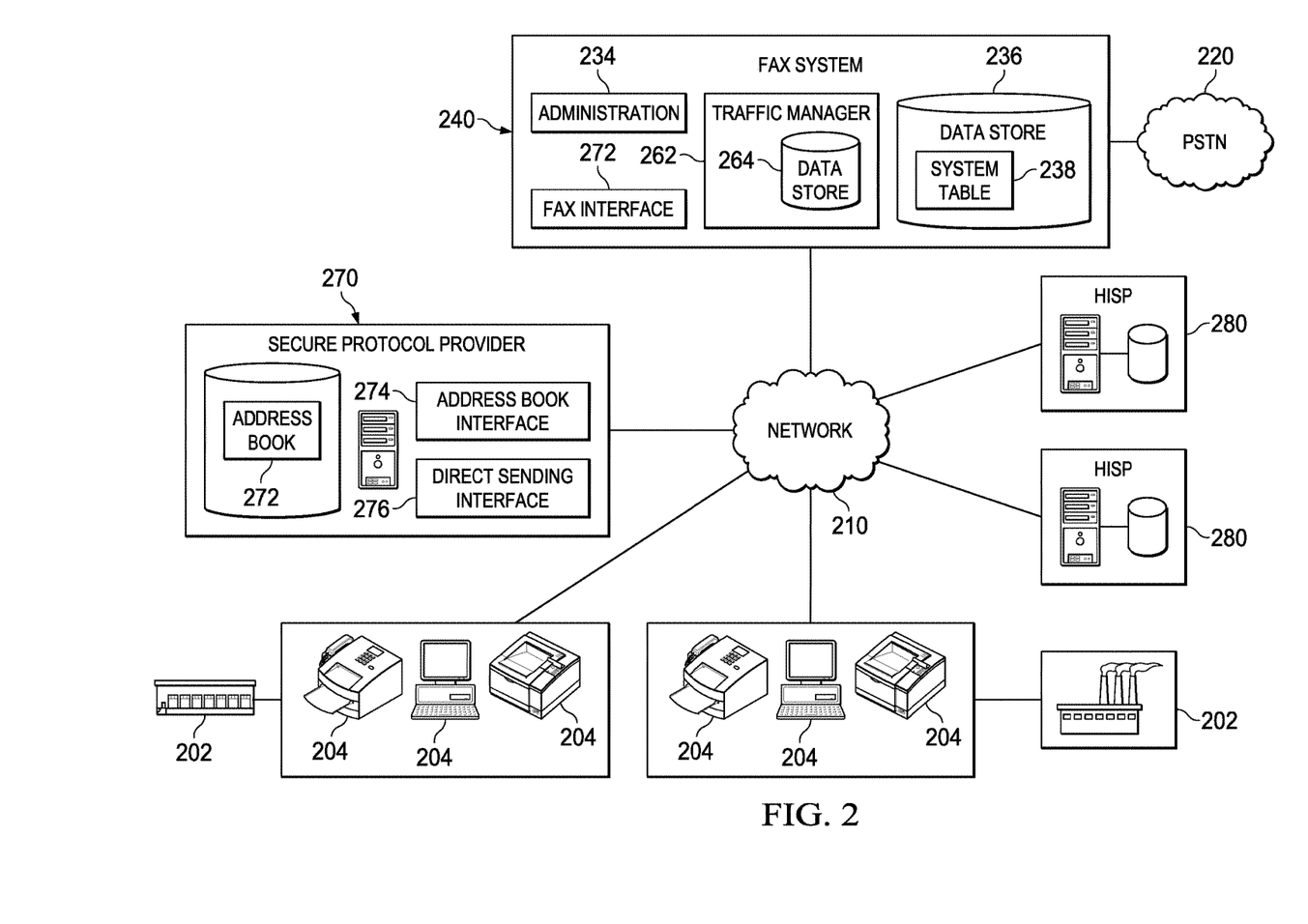
FIG. 2 is a block diagram depicting one embodiment of an architecture for a faxing system including a traffic manager.

Referring then to FIG. 2, one embodiment of an architecture for implementing secure messaging protocols in association with remote faxing is depicted. Here, the architecture includes a fax system 240 with an integration component 262 (referred to also as the traffic manager). Fax system 240 may include a multi-tenant fax system that allows users at tenants 202 to send faxes over the PSTN 220 or network 210. Fax system 240 may thus include an interface to PSTN 220 and be configured to send or receive faxes over the PSTN 220.

In particular, the fax system 240 may provide a faxing interface 272 that may be accessed via email (e.g., SMTP) over network 210 at a particular address to send a fax. Accordingly, users 204 at tenants 202 who desire to send a fax may compose an email with destination address that includes a local part that includes a destination telephone number for the fax and a domain part that is a domain associated with fax system 240 (e.g., 5125551212@fax2mail.com). The fax system 240 may then attempt to send the received fax via the PSTN 220 or network 210 as will be discussed. This fax system 240 may operate on one or more computing devices such as servers or the like, or may be implemented as a cloud based service (e.g., for example, in the Amazon EC2 cloud, the Microsoft Azure cloud, etc.). In one embodiment, for example, fax system 240 may include OpenText's Fax2Mail system.

Fax system 240 thus includes an administration module 234 configured to provide an interface by which tenants 202 who wish to receive faxes may register with the fax system 240. A tenant 202 may register and be provided with an identifier associated with that tenant 202. The tenant 202 can specify one or more originating domains or addresses from which faxes may be sent. A tenant 202 may also provide destination data. Such destination data may include, for example, a destination on the PSTN (e.g., a telephone number) associated with their fax system or a location on network 210 associated with their fax system (for example, an email address, a universal resource locator (URL), a universal resource indicator, an IP address, etc.). This destination data may be stored in registration system table 238 in data store 236. A tenant 202 may also specify whether they desire to utilize the Direct messaging protocol.

Thus, the registration system table 238 may comprise a set of identifiers with each identifier associated with a particular tenant. The identifier for each tenant 202 may also be associated with one or more registered destinations and associated destination data. This destination data may include a mapping between one destination and another destination. For example, a mapping between a telephone number on the PSTN and an email address or other destination on network 210 where the tenant 202 would like faxes sent to that telephone number to be actually delivered. Additionally, the system table 238 may include an indicator of whether the tenant 202 is using the Direct messaging protocol.

A fax may therefore be sent by a user at the tenant 202 by composing an email with an address having a local part including a desired destination on the PSTN 220 (e.g., a telephone number for the fax) and a domain part having a domain associated with fax interface 272. The document of the fax may be included as an attachment or incorporated into the body of the email. This email may be received at fax interface 272.

The fax interface 272 may check the system table 238 based on the domain of the sending address of the email to determine if the sender of the email is a registered tenant 202 and if the destination on the PSTN 220 associated with the received email (e.g., the local part of the destination email address) is a registered destination in the system table 232. If the sender is not a registered tenant 202 no more action may be taken or a denial email may be returned to the sender's email address. If the sender is associated with a registered tenant 202 but the destination (e.g., the telephone number in the local part of the destination email address) is not, the fax may be transmitted to the destination specified in the received email over the PSTN 220.

If, however, the sender is a registered tenant 202 and the destination on the PSTN 220 is a registered destination in the system table 238, fax interface 272 may access destination data associated with the destination on the PSTN in system table 238. Fax interface 272 may then transmit the fax over the network 210 to the location specified on network 210 specified in the destination data. If there is an error in the transmission, or the transmission is otherwise unsuccessful, the fax may be sent over the PSTN 220 to the original destination on the PSTN 220 provided in the destination address (e.g., the local part of the email address) of the email.

As discussed above, fax system 240 may be utilized by hospitals, insurance companies, physician's offices, lawyers' offices, etc. where it is desired to send protected health care information. In such cases, users 204 may be, for example, electronic medical records systems or the like such as, for example, Epic Systems Corporation's EHR software.

In these embodiments, then, fax system 240 includes traffic manager 262 and associated data store 264. Fax interface 272 may receive an email for a fax (e.g., a fax email with a destination address having a local part with a destination identifier on the PSTN and a domain part associated with fax interface 272 and including a document). Here, fax interface 272 may check the system table 238 based on the domain of the sending address of the email to determine if the sender of the email is associated with a registered tenant 202, if the destination on the PSTN 220 associated with the received email is a registered destination in the system table 232, or if the sending tenant 202 desires the use of the Direct messaging protocol.

If the sender is not a registered tenant 202 no more action may be taken or a denial email may be returned to the sender's address. If the sender is a registered tenant 202 and system table 232 indicates that the Direct messaging protocol should be used, fax interface 272 may provide the destination fax number and the document as determined from the received email to the traffic manager 262. Alternatively, the entire received email may be provided to the traffic manager 262.

The document may be in a traditional fax format such as a TIFF or other unstructured print stream type of document or may be in a native format such a produced by a particular application (e.g., a Word document, a Power Point, etc.). Traffic manager 262 may store received faxes (e.g., fax number and associated document) in data store 264. In some embodiments, as the document is treated as having sensitive health care data it may be encrypted before it is stored in the associated data store 264.

Traffic manager 262 may utilize a secure protocol provider 270 to attempt to send the document via the Direct protocol. Secure protocol provider 270 may include an address book 272 and a Direct sending interface 276 substantially as discussed. According to embodiments then, a fax including a document and a destination fax number is received at the traffic manager 262 from fax interface 272. Traffic manager 262 sends a request to the address book interface 274 with the fax number of the fax to determine if there is a Direct address associated with that fax number. Address book interface 274 accesses address book 272 that maps fax numbers to Direct addresses. Based on the access, the address book interface 274 either returns the Direct address associated with the fax number or an indication that no Direct address associated with the fax number could be found.

Traffic manager 262 receives the response from the address book interface 274 and if there is an indication that no Direct address exists for the fax number the traffic manager 262 may pass the fax to the fax interface 272 for the general sending of faxes as detailed above. The fax interface 272 may then send the fax to the fax number over the PSTN 220 or may send the document to an email address associated with the fax number over network 210, depending for example on a destination data associated with that fax number in system table 238.

Additionally, traffic manager 262 may send a fax to the fax number associated with the fax through the fax interface 272 (e.g., over the PSTN 220 or to an email address associated with the fax number over network 210) where the fax invites the recipient to join the Direct access faxing network. In one embodiment, this invitation fax may include two universal resource locators (URLs). A first URL may be indicated for use by the recipient if the recipient already has a Direct address and a second URL to utilize if the recipient does not have a Direct address. The URLs may be associated with address book interface 274 at secure protocol provider 270.

By accessing the first URL (e.g., by typing it into a browser or clicking on it in the case where the fax is delivered as an email, etc.) the address book interface 274 may provide an interface for the recipient where the recipient can (in some embodiments after undergoing an identity verification process) provide their Direct address in association with the fax number (e.g., the fax number originally associated with the fax) after undergoing an identity verification process. The mapping between the fax number and Direct address is then stored in the address book 272 for future use.

If the recipient access the second URL the address book interface 274 may provide an interface for the recipient where the recipient can, after undergoing an identity verification process, register for a Direct address and a corresponding digital certificate from HISP 280. HISP 280 can then issue a Direct address and digital certificate and the mapping between the fax number and Direct address is then stored in the address book 172. Alternatively, the second URL may take the recipient to register directly with HISP 280 to obtain a Direct address and the digital certificate, after which it can be provided through address book interface 274 to be stored in the address book 272. In this manner, new participants may easily and efficiently be added to the fax network environment.

If, instead of receiving a response from address book interface 274 that indicates no Direct address exists for the fax number, the traffic manager 262 receives a response from the address book interface 274 including a Direct address associated with the fax number, an attempt is made to send the document of the fax to the Direct address using the Direct protocol. Here, the traffic manager 262 may utilize Direct sending interface 276 of secure protocol provider 270 to send the document. To allow the secure protocol provider 270 to better accomplish this sending, in cases where the document of the fax is received in other than a native format (e.g., if it is received as a print stream or TIFF) Optical Character Recognition (OCR) may be performed on the document by traffic manager 262 to generate a searchable document such as a PDF.

Accordingly, traffic manager 262 utilizes Direct sending interface 276 to request the document be sent according to the Direct protocol and provides the document (e.g., the original native document or the searchable PDF in the case of an original non-native document) and the Direct address through the Direct sending interface 276.

Direct sending interface 276 attempts to determine appropriate patient metadata for the Direct protocol (e.g., name, date of birth, gender, etc.) by, for example, searching through the received document for certain keywords (or set of keywords), or a particular data format. The metadata needed may be specified, for example, by the specification for the Direct protocol. If the specified metadata cannot be found in the received document a message delivery failure notification (e.g., negative or failure MDN) may be returned from the Direct sending interface 276 to the requesting traffic manager 262.

If such a notification is received by the traffic manager 262, the traffic manager 262 may pass the fax to the fax interface 272 for the general sending of faxes as detailed above. In one embodiment, the fax may be retrieved from the data store 264 associated with the traffic manager 262 and decrypted before it is passed to the fax interface 272. The fax interface 272 may then send the fax to the fax number over the PSTN 220 or may send the document to an email address associated with the fax number, depending for example on a destination data associated with that fax number in system table 238.

If, however, the Direct sending interface 276 can determine the desired metadata from the received document, a Direct message to the determined Direct address is formed (e.g., an email to the Direct address), where the Direct message includes the received document or the content of the document and the determined metadata. The Direct message is then encrypted and sent (e.g., via SMTP) to the recipient (e.g., through the HISP 280 associated with the Direct address).

If there is a failure during the attempt to send the Direct message by the Direct sending interface 276 through HISP 280 a delivery failure notification (e.g., a negative MDN) may be received by the Direct sending interface 276 from the HISP 280. In this case, a delivery failure notification may be, in turn, returned from the Direct sending interface 276 to the requesting traffic manager 262.

If such a notification is received by the traffic manager 262, the traffic manager 262 may pass the fax to the fax interface 272 for the general sending of faxes as detailed above. The fax interface 272 may then send the fax to the fax number (e.g., the local part of the email address) over the PSTN or may send the document to an email address associated with the fax number depending for example on a destination data associated with that fax number in system table 238.

Figure 3:
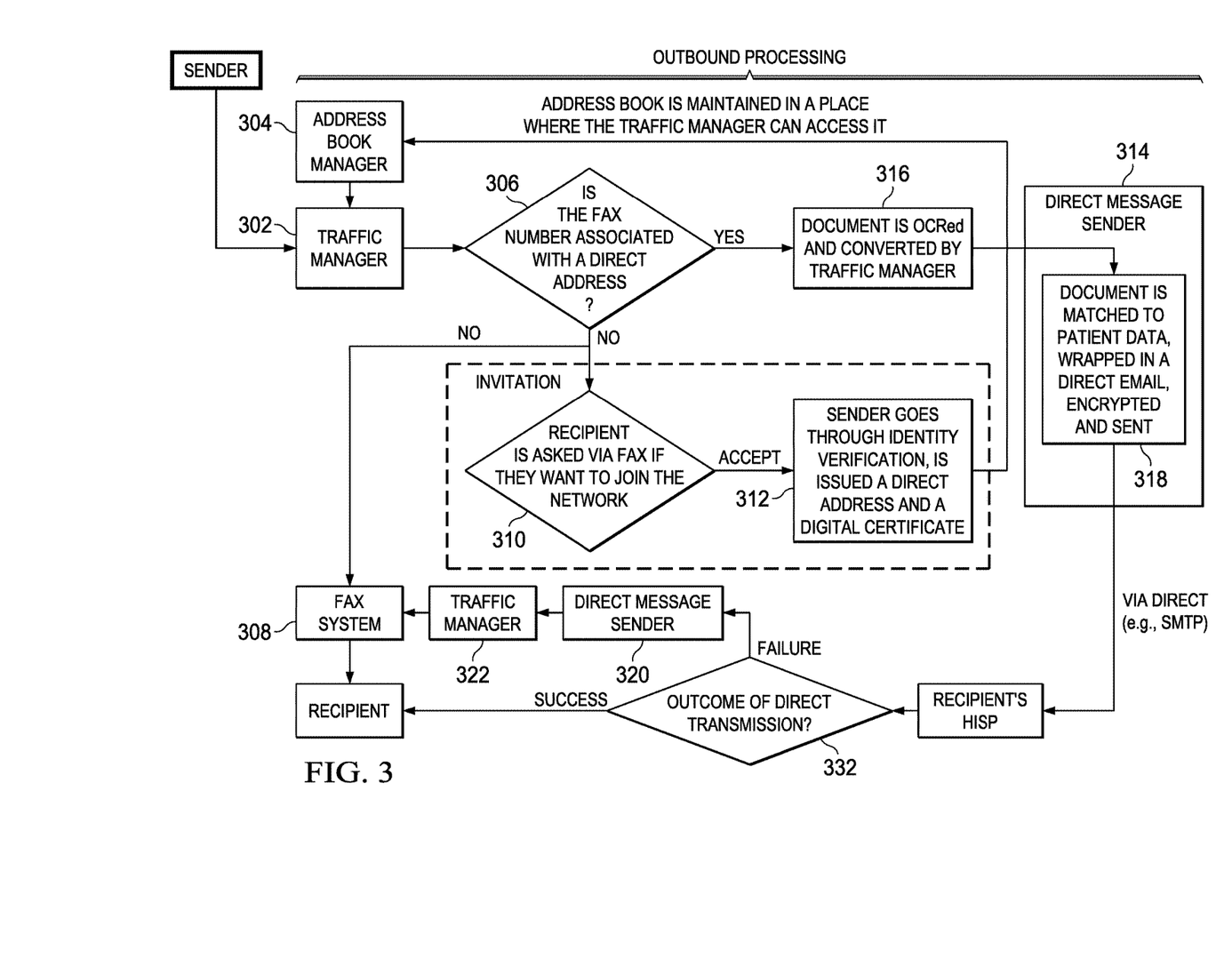
FIG. 3 is a flow diagram depicting one embodiment of a method for implementing a traffic manager.

FIG. 3 depicts a flow diagram of a method being performed by a traffic manager at a fax system. Embodiments or such a method may be utilized, for example, in conjunction with faxing system architecture such as those depicted in FIG. 1 or FIG. 2 above, among others. While this embodiment depicts the use of a Kno2 API or other interface by Kno2 as an address book and Direct sending interface and RightFax by OpenText as a fax system it should be understood that the method is generally applicable and in other embodiments other address book interfaces, Direct sending interfaces and other fax systems may be utilized.

At step 302, the traffic manager receives a fax originating from a sender, such as, for example, a EHR or EMR system within a sender's domain. The documents received for a fax may be received in a traditional fax format such as a TIFF or other unstructured print stream type of document or may be in a native format such a produced by a particular application (e.g., a Word document, a PowerPoint, Excel, etc.). The traffic manager may have an associated data store for storing received faxes (e.g., fax number and associated document). In some embodiments, as the document is treated as having protected health care data it may be encrypted before it is stored in the associated data store.

When a fax including document is received, at step 304 the traffic manger sends a request including the fax number to an address book interface to determine if there is a Direct address associated with that fax number. At step 306 it can be determined if there is a Direct address associated with the fax number. If there is no Direct address that exists for the fax number the traffic manager may, at step 308, pass the fax to a fax system for the general sending of faxes. The fax system may then send the fax to the recipient (e.g., either via the PSTN or a computer based network according to the implementation of the fax system).

Additionally, at step 310 the traffic manager may send an invitation fax to the fax number associated with the originally received fax through the fax system, where the invitation fax invites the recipient to join the Direct access faxing network. This invitation fax may include two universal resource locators (URLs). A first URL may be indicated for use by the recipient if the recipient already has a Direct address and a second URL to utilize if the recipient does not have a Direct address. By accessing the first URL (e.g., by typing it into a browser or clicking on it in the case where the fax is delivered as an email, etc.) the address book interface may provide an interface for the recipient where the recipient can provide their Direct address in association with the fax number after undergoing an identity verification process at step 312. The mapping between the fax number and Direct address is then stored in the address book at step 312. If the recipient access the second URL the recipient can, after undergoing an identity verification process at step 312, register for a Direct address and a corresponding digital certificate from a HISP. HISP can then issue a Direct address and digital certificate and the mapping between the fax number and Direct address is then stored in the address book at step 312.

If traffic manager, at step 306, determines there is a Direct address associated with the fax number an attempt is made to send the document of the fax to the Direct address using the Direct protocol at step 314. In cases where the document of the fax is received in other than a native format (e.g., it is received as a print stream or TIFF) Optical Character Recognition (OCR) may be performed on the document to generate a searchable document (e.g., in a PDF format) at step 316 before an attempt is made to send the document of the fax to the Direct address over the computer network. Accordingly, the document (e.g., the original native document or the searchable document in the case of an original non-native document) is provided along with the Direct address to the Direct sender.

A Direct message to the determined Direct address is formed (e.g., an email to the Direct address in the Direct message format) at step 318, where the Direct message including the document or the content of the document and determined metadata. This metadata may be determined by the Direct message sender by, for example, performing a search on the received document (e.g., either the native document or the document in the searchable document). The Direct message is then encrypted and sent (e.g., via SMTP) to the recipient (e.g., through the recipient's HISP associated with the Direct address) at step 318.

If there is a failure during the attempt to send the Direct message through the recipient's HISP at step 332, a delivery failure notification (e.g., a negative or failure MDN) may be received at step 320 by the traffic manager. In particular, a message delivery notification may be received at the direct message sender, where the MDN indicates the outcome of the attempt to send the Direct message to the recipient via the computer network. If the outcome was successful (e.g., a MDN of success or dispatched) the recipient may have received the message.

If, however, the MDN indicates failure, an attempt may be made to send the fax via the general fax system. In particular, the delivery failure notification may be initially received by the Direct message sender through which the traffic manager initially attempted to send the Direct message. The delivery failure notification may then be returned from the Direct message sender to the traffic manager (e.g., as a response to the request to send the direct message sent by the traffic manager). If such a notification is received by the traffic manager, the traffic manager may, at step 322, pass the fax to the fax system for the general sending of faxes. The fax system may then send the fax to the recipient (e.g., either via the PSTN or a computer based network according to the implementation of the fax system).

Figure 4:
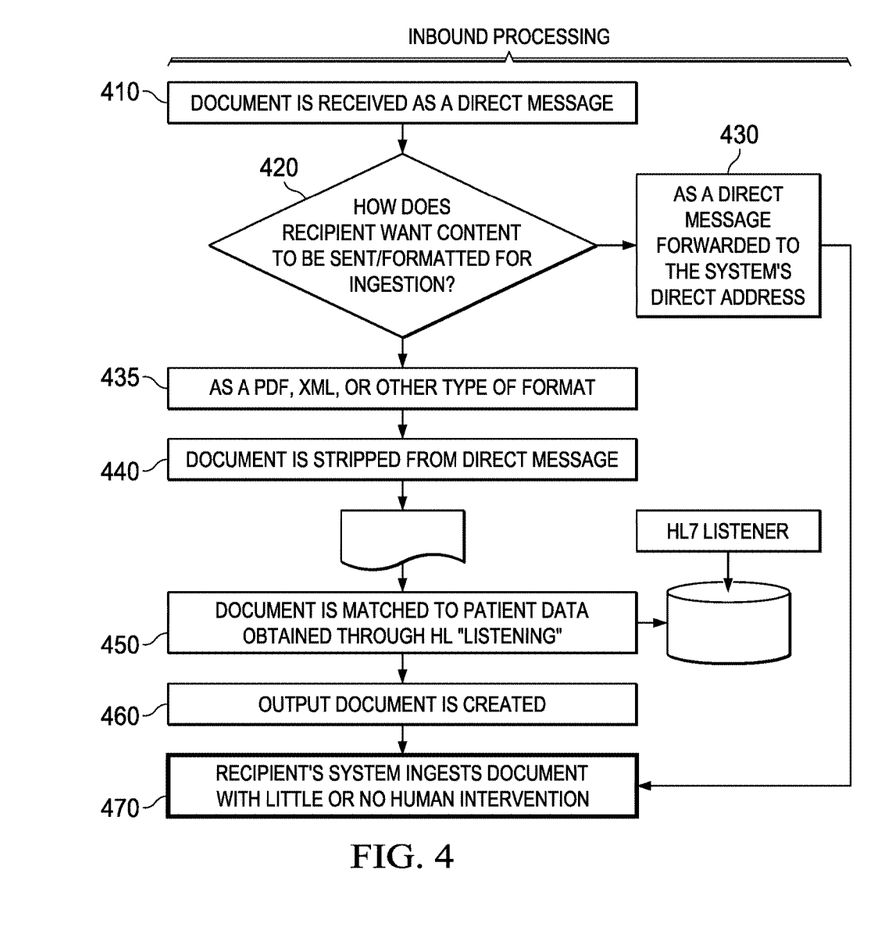
FIG. 4 is a flow diagram depicting one embodiment of a method for receiving Direct messages.

Turning now to FIG. 4, one embodiment of a method for receiving a fax sent as a Direct message is depicted. In particular, embodiments of this method may be used to integrate the Direct message including the fax into a recipient's EMR or EHR system. It should be understood, however, other embodiments may also be effectively utilized to integrate such a Direct message into other systems utilized by a recipient.

When the fax is received as a Direct message at step 410 it can be determined how the recipient wants to integrate the document of the fax into their system at step 420. If the receiver has set up to integrate Direct messages with their own system (e.g., their own EHR or EMR) the received Direct message may be forwarded to the Direct address of the recipient's system at step 430. The document of the Direct message can then be integrated with the EMR or other system at the recipient, at step 470.

If it is preferred to integrate the document as a PDF or XML or other type of standard format (e.g., to integrate directly with a document management system or another type of system) at step 435, the document may be stripped from the Direct message at step 440. In particular, this may entail obtaining the document from the body of the Direct message. The document can then be matched to patient data contained in a database built by a component that, for example, observes communications (e.g., HL7 messages) being communicated between various systems or components within the recipient's computer network at step 450. Specifically, such a component may build a database of patient numbers and associated patient data based on listening or "snooping" HL7 based or other types of messages being communicated between various systems at the recipients site. An example of such a component is the "Open-Link" component by Kno2.

Thus, the metadata for the received Direct message may also be obtained from the Direct message. This metadata may include, for example, fields such as author, confidentialityCode, healthcareFacilityTypeCode, and patientId or sourcePatientId. In particular, the patientId or sourcePatientId may be formatted according to HL7.

Using the metadata associated with the received Direct message then, the patient data obtained from the metadata (e.g., from the patientId or sourcePAtientId fields) may be submitted in a request to locate a patient number or other recipient specific data associated with that patient from the database comprising patient data. If the metadata received with the Direct message can be correlated with an entry in this database, a patient number to associate with the document may be able to be determined at step 450. An output document in particular format (e.g., PDF or XML) may be generated at step 460. This document may be associated with the patient number assigned by the recipient in cases where the patient number can be located in the database. This document can be integrated with the EMR or other system at the recipient at step 470.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. For example, it will be understood that while embodiments as discussed herein are presented in the context of a browser based application other embodiments may be applied with equal efficacy to other types of components on computing device (e.g., other native components, etc.).

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system for sending a fax as a Direct Message, comprising:
    a faxing system configured to send the fax; and
    a traffic manager, the traffic manager including a computer readable medium having instructions for:
        receiving a fax including a document and a destination telephone number from a sender;
        determining if there is a Direct Address associated with the destination telephone number, wherein the Direct Address is an email address linked to an associated certificate that confirms the identity of a domain name or address;
        if there is the Direct Address associated with the destination telephone number, initiating a sending of a Direct Message with the document of the fax to the Direct Address; and
        if there is not the Direct Address associated with the destination telephone number, sending the fax through the fax system based on the destination telephone number and sending an invitation fax to the destination telephone number through the fax system, wherein the invitation fax includes a location to access an interface through a computer based network to provide or obtain the Direct Address to associate with the destination telephone number of the fax.

2. The system of claim 1, wherein sending the fax comprises determining a second destination on a computer based network associated with the telephone number and sending the fax to the second destination over the computer based network.

3. The system of claim 1, wherein sending the fax comprises sending the fax to the destination telephone number over a publicly switched telephone network (PSTN).

4. The system of claim 1, wherein the document is received over a computer based network in an unstructured print stream format.

5. The system of claim 4, wherein the computer readable medium has instructions for converting the document to a searchable format before initiating the sending of the Direct Message.

6. A method for sending a fax as a Direct Message, comprising:
    receiving a fax including a document and a destination telephone number from a sender;
    determining if there is a Direct Address associated with the destination telephone number, wherein the Direct Address is an email address linked to an associated certificate that confirms the identity of a domain name or address;
    if there is the Direct Address associated with the destination telephone number, initiating a sending of a Direct Message with the document of the fax to the Direct Address; and
    if there is not the Direct Address associated with the destination telephone number, sending the fax based on the destination telephone number and sending an invitation fax to the destination telephone number through the fax system, wherein the invitation fax includes a location to access an interface through a computer based network to provide or obtain the Direct Address to associate with the destination telephone number of the fax.

7. The method of claim 6, wherein sending the fax comprises determining a second destination on a computer based network associated with the telephone number and sending the fax to the second destination over the computer based network.

8. The method of claim 6, wherein sending the fax comprises sending the fax to the destination telephone number over a publicly switched telephone network (PSTN).

9. The method of claim 6, wherein the document is received over a computer based network in an unstructured print stream format.

10. The method of claim 9, further comprising converting the document to a searchable format before initiating the sending of the Direct Message.

11. A non-transitory computer readable medium comprising instructions for sending a fax as a Direct Message by:
    receiving a fax including a document and a destination telephone number from a sender;
    determining if there is a Direct Address associated with the destination telephone number, wherein the Direct Address is an email address linked to an associated certificate that confirms the identity of a domain name or address;
    if there is the Direct Address associated with the destination telephone number, initiating a sending of a Direct Message with the document of the fax to the Direct Address; and
    if there is not the Direct Address associated with the destination telephone number, sending the fax based on the destination telephone number and sending an invitation fax to the destination telephone number through the fax system, wherein the invitation fax includes a location to access an interface through a computer based network to provide or obtain the Direct Address to associate with the destination telephone number of the fax.

12. The non-transitory computer readable medium of claim 11, wherein sending the fax comprises determining a second destination on a computer based network associated with the telephone number and sending the fax to the second destination over the computer based network.

13. The non-transitory computer readable medium of claim 11, wherein sending the fax comprises sending the fax to the destination telephone number over a publicly switched telephone network (PSTN).

14. The non-transitory computer readable medium of claim 11, wherein the document is received over a computer based network in an unstructured print stream format.

15. The non-transitory computer readable medium of claim 11, further comprising instructions for converting the document to a searchable format before initiating the sending of the Direct Message.

* * * * *